United States Patent [19]

Pepmeier

[11] 4,038,018

[45] July 26, 1977

[54] APPARATUS FOR MOLDING OF FILAMENT-REINFORCED PLASTIC RODS

[75] Inventor: Carl R. Pepmeier, Fredericksburg, Va.

[73] Assignee: FMC Corporation, Philadelphia, Pa.

[21] Appl. No.: 697,883

[22] Filed: June 21, 1976

[51] Int. Cl.² .............................................. B29C 27/14
[52] U.S. Cl. ................................... 425/505; 425/112; 156/459; 156/494; 425/DIG. 201
[58] Field of Search ............... 425/505, 517, 111, 112, 425/515, DIG. 201; 156/494, 495, 161, 163, 164, 459

[56] References Cited

U.S. PATENT DOCUMENTS

| | | | |
|---|---|---|---|
| 2,141,405 | 12/1938 | Randall | 425/505 X |
| 3,274,037 | 9/1966 | Nixon | 425/505 X |
| 3,432,582 | 3/1969 | Bender | 425/505 X |
| 3,479,697 | 11/1969 | Kramarow | 425/517 |

*Primary Examiner*—Robert L. Spicer, Jr.
*Attorney, Agent, or Firm*—Eugene G. Horsky

[57] ABSTRACT

Apparatus for molding of filament-reinforced plastic rods, such apparatus having an improved shaping device for expressing air from a longitudinally advancing, elongated mass, comprised of a bundle of filaments embedded within an unset plastic material, and for imparting a desired round cross-section to such mass during the continuous travel thereof.

8 Claims, 10 Drawing Figures

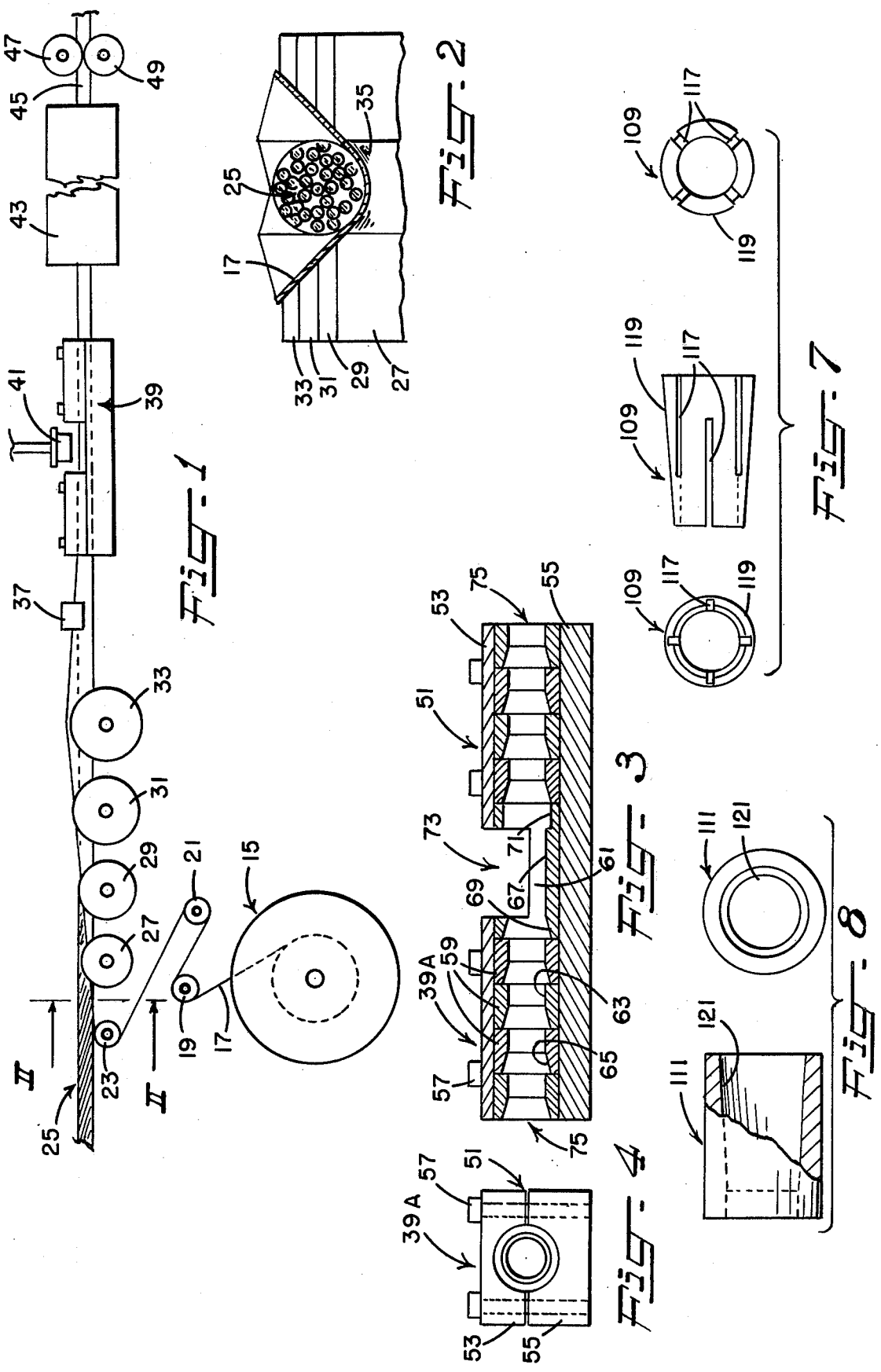

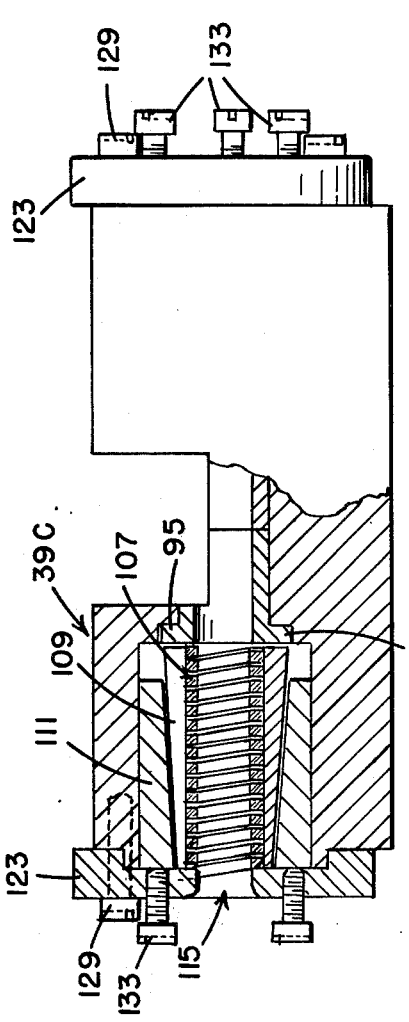
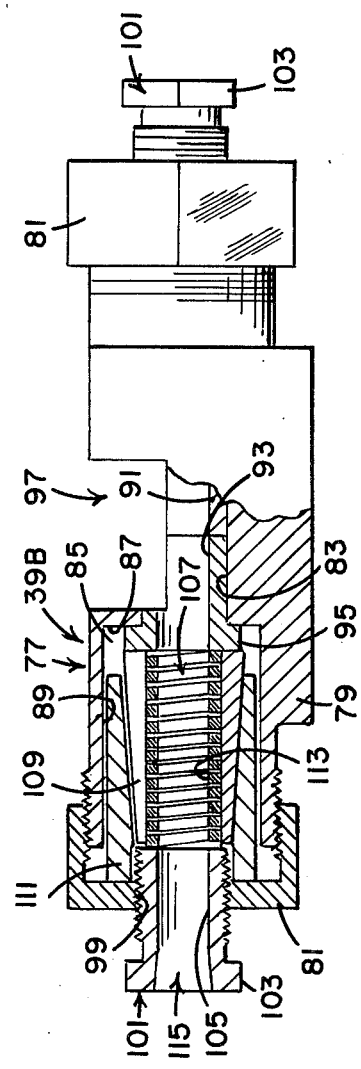
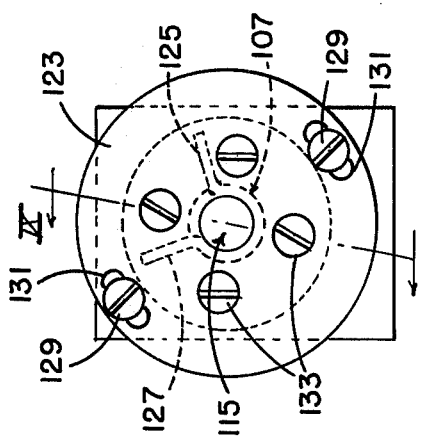
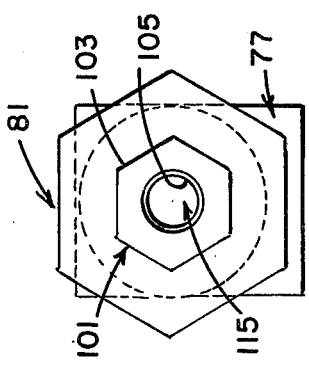

APPARATUS FOR MOLDING OF FILAMENT-REINFORCED PLASTIC RODS

The present invention is directed to an improved apparatus for molding of filament-reinforced plastic rods in which a longitudinally advancing mass, comprised of a bundle of filaments embedded within an unset plastic material, is wrapped or encased with a sheet material and, during the continuous advancement thereof, is shaped into a desired round cross-section while air is simultaneously expressed from the encased plastic material, after which the encased plastic material is set.

With conventional apparatus for molding of filament-reinforced plastic rods, as for example, rods which are intended for use as fishing poles, a bundle of glass filaments are embedded within an uncured thermosetting plastic material and, while being continuously advanced, successive longitudinal edge portions of a continuous regenerated cellulose web or film are progressively deflected laterally about this mass of filaments and plastic material to provide a tube encasing the same. This now encased mass is shaped into a round cross-section and then passed through an oven to cure the thermosetting plastic material, after which the tube of regenerated cellulose is stripped away.

The presence of the tube of regenerated cellulose serves to retain the integrity and the contour imparted to the uncured thermosetting plastic material and embedded glass filaments during the shaping thereof and, of course, permits this encased mass to be engaged and advanced toward and into the curing oven. A regenerated cellulose web serves well for this purpose since it neither adheres to nor reacts with the thermosetting plastic material, nor is it destroyed under the curing conditions encountered and thus it can be subsequently stripped away with ease. Further, such web is readily shaped into a tube about the mass of uncured plastic material and embedded filaments, provides the resulting rod with a desired surface finish, is readily available and is economical.

A particular disadvantage encountered with conventional molding apparatus, as described above, is that minute bubbles of air may be entrapped within the uncured thermosetting plastic material which, after the curing stage, manifest themselves as voids within or pits along the surface of the finished molded rod. Heretofore, attempts to remove such contained air bubbles from the uncured thermosetting plastic material generally result in distortion of the contour imparted to the encased mass and/or retardation or interruption of its intended continuous longitudinal advancement. Accordingly, a primary object of this invention is the provision of an improved and more satisfactory apparatus for molding of filament-reinforced plastic rods.

Another object of this invention is an improved apparatus for molding plastic rods in which air contained within a mass, comprised of a bundle of filaments and unset plastic material, is expressed therefrom, concomitantly with the shaping of and during the continuous longitudinal advancement of such mass.

Still another object of this invention is the provision of an improved apparatus for molding of plastic rods having a shaping device for imparting a desired cross-section to a continuously traveling, encased mass, comprised of a bundle of filaments and unset plastic material, without subjecting such mass to excessive tension.

A further object is the provision of an improved molding apparatus having adjustable shaping means for imparting a precise circular cross-sectional to an encased mass, comprised of a bundle of filaments and an unset plastic material, during continuous longitudinal advancement of such mass.

These and other objects are accomplished in accordance with the present invention by an apparatus for molding of reinforced plastic rods which includes, as an improvement, a shaping device which is adapted to radially squeeze a mass, comprised of a plurality or bundle of longitudinally advancing filaments embedded within an unset plastic material, to express contained air therefrom and to shape the same into a precise circular cross-section without distorting such mass or inhibiting the advancement thereof.

More specifically, the shaping device of the present invention is an improvement to molding apparatus which includes means for continuously advancing a moldable mass, comprised of a bundle of filaments embedded within an unset or uncured plastic material, means for progressively deflecting successive longitudinal edge portions of a continuous web of sheet material, and particularly regenerated cellulose film, onto this mass concomitantly with the continuous advancement thereof with such mass to provide a tube encasing the filaments and plastic material and means for setting or curing the encased plastic material.

The shaping device itself includes an elongated passage through which the encased mass, comprised of the unset plastic material and filament bundle, travels during its advancement toward the setting or curing means. This passage is defined by annular surfaces which are dimensioned to radially squeeze the encased mass, to thereby express contained air therefrom while concomitantly imparting a desired circular contour thereto, and which have at least portions which are spaced longitudinally from adjacent of such annular surfaces to minimize frictional contact.

In one embodiment of the invention, the shaping device includes a series of like, longitudinally aligned orifice elements, each having an annular surface at one end thereof which blends or merges into a surface which flares to a larger diameter at the opposite end of such element. These orifice elements are arranged with the annular surfaces in alternating relationship to thereby minimize frictional contact between such surfaces and the surface of the encased mass.

In further embodiments, the shaping device includes a square wire cylindrical spring which is contained within a housing, with the annular surfaces of the spring convolutions defining a passage. Means are provided for varying the spacing between adjacent spring convolutions and for radially adjusting such convolutions to vary the diameter of the passage.

In all embodiments, the annular surfaces which define the passage through the shaping device may be coated with a friction reducing material and in the embodiment first described the orifice elements may be formed of or coated at least along the annular surfaces thereof with an abrasion resistant ceramic material.

For a better understanding of the present invention, reference is made to the following detailed description and drawing in which:

FIG. 1 is a diagrammatic illustration of a molding apparatus having incorporated therein the improved shaping device of the present invention;

FIG. 2 is a transverse vertical section taken along the line II—II of FIG. 1;

FIG. 3 is a vertical section taken longitudinally of one embodiment of the improved shaping device of the present invention;

FIG. 4 is an end view of the device shown in FIG. 3;

FIG. 5 is a side view of a second embodiment of the improved shaping device of the present invention, with a portion thereof shown in section;

FIG. 6 is an end view of the device shown in FIG. 5;

FIG. 7 is a side view and opposite end views of an element of the device shown in FIGS. 5 and 6;

FIG. 8 is a side view and an end view of another element of the device shown in FIGS. 5 and 6;

FIG. 9 is a section along the line IX—IX of FIG. 10; and

FIG. 10 is an end view of the device shown in FIG. 9.

With reference to FIG. 1, indicated at 15 is supply roll of a regenerated cellulose film or web 17 which is laced over idler rolls 19 and 21 and then about a roll 23. At the roll 23, the web 17 is generally flat and it here first engages with a mass 25, comprised of a bundle of continuous filaments embedded within an uncured thermosetting plastic material, which is advanced from a suitable supply, not shown. From the roll 23, the web 17 and the mass 25 are together advanced continuously, by means as hereafter described, relative to a series of aligned web deflecting rollers 27, 29, 31 and 33, which are constructed and function in a manner as described in my U.S. Pat. No. 3,777,632.

More particularly, the successive of the series of rollers 27, 29, 31 and 33 are each of larger diameter than a preceding roller of such series and are each formed with a peripheral groove, such as indicated at 35 in FIG. 2. The grooves in the rollers 27, 29, 31 and 33 are of like width but are of greater depth along successive of such series of rollers. With this construction, and as shown in FIGS. 1 and 2, successive longitudinal edge portions of the web 17 are progressively deflected laterally, or upwardly as viewed in FIG. 2, as such web 17 and the mass travel along and relative to the progressively deeper roller grooves. This series of rollers 27, 29, 31 and 33 may be positively driven at a common speed or may be turned by the movement of the advancing web 17.

As in the apparatus disclosed in my above noted United States Patent, the apparatus of the present invention includes a conventional, fixed folding finger 37 which urges one longitudinal edge portion of the web 17 onto the mass 25 after such web 17 has been deflected into an essentially U-shaped contour by the series of rollers 27, 29, 31 and 33. Such longitudinal edge portion of the web 17 is subsequently overlapped by the opposite longitudinal edge portion of the web 17 as this web 17 and the mass 25 are advanced into a shaping device, indicated generally at 39 and hereinafter described in detail.

In this manner the mass 25 of glass filaments and uncured thermosetting plastic material is encased within a continuous tube formed of the web 17 of regenerated cellulose. The regenerated cellulose web 17 may include a heat-sealable coating on one side thereof to facilitate sealing of overlapping edge portions thereof, as by a heated shoe shown in 41.

Once beyond the shaping device 39, the now encased mass 25 is advanced through an oven 43 which is maintained at such elevated temperature as to effect the necessary curing or setting of the thermosetting plastic material of the mass 25 during its travel therethrough. Beyond the oven 43, the resulting hardened filament-reinforced plastic rod, indicated at 45, is cut into desired lengths, before or after the removal of the encasing regenerated cellulose web. Advancement of the web 17 from the supply roll 15 and subsequently with the mass 25 relative to the series of rollers 27, 29, 31 and 33, the folding finger 37, the shaping device 39 and the oven 43 is achieved by engaging and positively moving the rod 45 in its longitudinal direction. For example, this may be accomplished by one or more pairs of cooperating driven rollers 47 and 49, the peripheral surfaces of which are shaped to snugly grip such rod 45.

FIGS. 3 and 4 illustrate one embodiment of the shaping device, indicated as 39A, which includes a split-housing 51 formed of cooperating sections 53 and 55 which are connected by screws 57 to contain longitudinally aligned, tubular orifice elements 59 and 61. The orifice elements 59 are of like construction, each having an annular surface 63 at one end thereof which blends or merges into a conical surface 65 which flares to a larger diameter at the opposite end of such element 59. The orifice element 61 includes an arcuate surface 67 and a flared surface 69, which correspond with the surfaces 63 and 65, respectively, of the element 59, and a second annular surface 71 which has a diameter substantially equal to the larger diameter of the flared surface 65. The housing section 51 and the orifice element 61 are slotted at 73 to accommodate the heated shoe, such as indicated at 41 in FIG. 1.

The orifice elements 59 and 61 are arranged in FIG. 3, to define a passage 75 in which the surfaces 63 are spaced from each other and the surface 69. The surfaces 63 are dimensioned to exert a slight radially squeezing of the encased mass 25 as it travels through the passage 75. Thus, it is preferred that the entrance of the passage 75 be defined by a flared surface 65 to facilitate the escape of air which may be expressed from such mass 25 by the squeezing thereof and, also, to facilitate the proper overlapping of the longitudinal edge portions of the web 17 as such web and mass 25 enter the device 39A.

With the spaced arrangement of surfaces 63 and 69, friction on the encased mass 25 is minimized. The orifice elements 59 and 61 may be formed of hardened tool steel and, if desired, the surface 63 and 69 may be coated with a friction reducing material, such as Teflon (Registered Tradmark) and/or an abrasion or wear-resistant ceramic material. Of course, the orifice elements may be formed entirely of such ceramic material. The use of a sectional housing and a series of separate orifice elements 59 and 61 as described above permits individual of such elements to be replaced as they experience excessive wear.

If no heated shoe is to be employed, the orifice element 61 may be omitted, the shaping device 39A then having only a series of orifice elements 59 disposed in abutting, longitudinally aligned relationship.

Reference is now made to FIGS. 5–8 which illustrate a second embodiment of the shaping device, designated as 39B. Forming part of the shaping device 39B is a housing 77 which includes a body member 79 and caps 81 threaded onto opposite ends of such body member. The body member 79 is formed with a central opening 83 which is enlarged at its opposite ends to provide cavities 85, each having radial and annular surfaces 87 and 89, respectively. Bushings 91 are seated within the oppsite ends of the opening 83, as with a press fit. Each of the bushings 91 has an inner annular surface 93 and a flange 95, the latter of which engages with an adjacent radial surface 87.

A slot 97 extends centrally through a portion of the body member 79 and the aligned bushings 91, such slot corresponding to the slot 73 herebefore mentioned and adapted to receive a heated shoe, such as shown at 41 in FIG. 1. The end caps 81 are each formed with a central opening 99 into which is treaded a nut 101 having a hex-head 103, to facilitate adjustment thereof, and a central annular surface 105 which is flared at its entrance.

Insofar as the opposite end portions of the shaping device 39B are of like construction, a detailed description of only one of such end portions is hereafter provided. Thus, disposed within the housing cavity 85 is a square wire spring 107, a collet 109 and a sleeve 111. The spring 107 is telescoped within the collet 109 with the adjacent ends of such spring and collet abutting with the bushing flange 95, while the opposite end of the spring 107 abuts against the innermost end of the nut 101. The collet 109 is partially telescoped into the sleeve 111, the latter which has one end thereof engaged with the end cap 81.

The spaced internal annular surfaces 113 of the spring convolutions, together with the annular surfaces 93 and 105 of the bushing 91 and the nut 101, provide a passage 115 through which the encased mass 25 is adapted to travel.

As shown in FIG. 7, the collet 109 is of conventional construction, having slots 117 which extend from opposite ends thereof along more than one-half but less than the total collet length to impart radial flexibility to the collet. The exterior surface 119 of the collet 109 is tapered and is adapted to mate with a corresponding surface 121 formed within the sleeve 111, as shown in FIG. 8.

With the elements of the shaping device 39B being assembled as shown in the FIGS. 5 and 6, the annular surfaces 93, 105 and 113 of the bushing 91, the nut 101 and the spring 107, respectively, together define the annular passage 115 within which the encased mass 25 is squeezed slightly in a radial direction and, concomitantly, is shaped into a desired circular cross-section during its passage therethrough. The spaced convolutions of the spring 107 minimize the degree of friction to which the encased mass 25 is subjected and, further, the annular surfaces 113 thereof, as well as the annular surfaces 93 and 105 of the bushing 91 and nut 101, may be coated with a friction-reducing material.

A particular advantage of the shaping device 39B is that the nut 101 may be adjusted relative to the cap 81 to thereby vary the spacing between the convolutions of the spring 107. Further, the end cap 81 may be adjusted relative to the main body 79 so as to urge the sleeve 111 onto the collet 109 to increase slightly the radial compressive force which the spring 107 exerts on the encased mass 25 as it travels through the passage 115.

The embodiment of the shaping device shown in FIGS. 9 and 10, and designated as 39C, is essentially a modification of the device 39B and differs from the latter by employing end plates 123, in lieu of caps 81, and by having opposite ends 125 and 127 of the square wire spring 107 seated within radially extending slots formed in the bushing flange 95 and the end plate 123.

The end plates 123 are fixed to the main body 79 by screws 129, with each of such plates 123 being formed with arcuate slots 131 to permit limited rotation thereof relative to the screws 129 and body 79. With this construction, the end plate 123 may be rotated to vary the spacing between the convolutions of the spring 107 and then locked in adjusted position by the screws 129. Included also in the device 39C are a series of screws 133 which are threaded through respective end plates 123 and engage with the adjacent end of a sleeve 111. Upon rotating of the screws 133 so as to urge the sleeve 111 onto the collet 109, the collet 109 and the spring telescoped therein are radially compressed to thereby reduce the inner diameter of the passage 115 and thus subject the encased mass to a slightly greater squeezing action during its travel through such passage.

It is to be understood that changes and variations may be made without departing from the spirit and scope of the invention as defined in the appended claims.

I claim:

1. In an apparatus for molding of reinforced plastic rods, said apparatus including means for continuously advancing a continuous, generally flat web which is in contact with a mass comprised of a bundle of filaments embedded within an unset plastic material, means for progressively deflecting successive longitudinal edge portions of the continuous web transversely and about the mass concomitantly with the continuous advancement of the web and mass to thereby a tube encasing such mass and means for setting the plastic material of the encased mass, the improvement comprising a shaping device having an elongated passage through which the encased mass is adapted to travel during the advancement thereof towards said setting means, said elongated passage being defined by generally like annular surfaces which are dimensioned to radially squeeze the encased mass to thereby express contained air therefrom while concomitantly imparting a precise circular cross-sectional shape thereto, at least portions of said annular surfaces being spaced longitudinally from adjacent of said annular surfaces to thereby minimize frictional retardation of the encased mass during its travel through said shaping device.

2. In an apparatus as defined in claim 1 wherein said shaping device includes a series of longitudinally aligned, tubular orifice elements with internal portions of said elements defining said annular surfaces, the annular surfaces of certain of said orifice elements each extending from one end of respective of such orifice orifice elements and merging with a surface which flares to a larger diameter at the opposite end of such respective elements, said longitudinally aligned orifice elements being arranged in end abutting relationship with at least some of said annular surfaces alternating with said flared surfaces.

3. In an apparatus as defined in claim 1 wherein said shaping device includes a square wire cylindrical spring in which internal portions of the spring convolutions define said annular surfaces, abutment means engaged with the opposite ends of said spring and means for radially adjusting the convolutions of such spring to thereby vary the diameter of said passage.

4. In an apparatus as defined in claim 3 wherein said adjusting means includes a tubular collet and a sleeve positioned between said abutment means, said collet being telescoped snugly onto said spring and partially into said sleeve and having a conical external surface mating with a corresponding internal surface on said sleeve and circumferentially spaced slots extending longitudinally from opposite ends thereof along more than one-half but less than the total collet length with only alternate of such slots opening at the same end of said collet, and means for relatively moving said collet and sleeve axially to flex portions of said collet radially against said spring to thereby compress said spring and reduce the diameter of said passage.

5. In an apparatus as defined in claim 4 further including a housing having a body member formed with a cavity within which said spring, collet and sleeve are contained and wherein one of said abutment means engages with one end of said sleeve and comprises a closure extending across one end of said cavity, said end closure having an opening therein aligned with and of a diameter at least equal to that of said passage, the other of said abutments engages with the end of said collet which projects from said sleeve, and said means for relatively moving said collet and sleeve includes screw threads connecting said end closure to said body member and facilitating relative movement therebetween.

6. In an apparatus as defined in claim 4 further including a housing having a body member formed with a cavity within which said spring, collet and sleeve are contained and wherein one of said abutment means engages with one end of said sleeve and comprises a closure extending across one end of said cavity, said end closure having an opening therein aligned with and of a diameter at least equal to that of said passage, the other of said abutments engages with the end of said collet which projects from said sleeve and said means for relatively moving said collet and sleeve includes adjustable screws threaded through said end closure and engaging with said one end of said sleeve.

7. In an apparatus as defined in claim 5 wherein said end closure includes a bushing threaded into the opening thereof and engaging with the adjacent end of said spring, said bushing having an internal diameter at least equal to that of said passage.

8. In an apparatus as defined in claim 6 wherein the ends of said spring are seated within said abutment means and wherein said end closure is rotatable about the axis of said spring.

* * * * *

UNITED STATES PATENT AND TRADEMARK OFFICE
CERTIFICATE OF CORRECTION

PATENT NO. : 4,038,018
DATED : July 26, 1977
INVENTOR(S) : Carl R. Pepmeier

It is certified that error appears in the above-identified patent and that said Letters Patent are hereby corrected as shown below:

Column 3, line 18, "is supply" should read --is a supply--. Column 4, line 46, "surface" should read --surfaces--; line 48, "Tradmark)" should read --Trademark)--; line 68, "oppsite" should read --opposite--. Column 5, line 9, "treaded" should read --threaded--. Column 6, line 10, "spring" should read --spring 107--; line 27, "thereby a" should read --thereby provide a--.

Signed and Sealed this

Nineteenth Day of June 1979

[SEAL]

Attest:

RUTH C. MASON
*Attesting Officer*

DONALD W. BANNER
*Commissioner of Patents and Trademarks*